United States Patent
Chen et al.

(10) Patent No.: US 12,062,189 B2
(45) Date of Patent: Aug. 13, 2024

(54) OBJECT TRACKING METHOD AND OBJECT TRACKING DEVICE

(71) Applicant: HTC Corporation, Taoyuan (TW)

(72) Inventors: Yuan-Tung Chen, Taoyuan (TW); Jyun-Jhong Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 206 days.

(21) Appl. No.: 17/402,626

(22) Filed: Aug. 16, 2021

(65) Prior Publication Data
US 2022/0067949 A1 Mar. 3, 2022

Related U.S. Application Data

(60) Provisional application No. 63/069,728, filed on Aug. 25, 2020.

(51) Int. Cl.
*G06T 7/246* (2017.01)
*H05B 47/125* (2020.01)

(52) U.S. Cl.
CPC .......... *G06T 7/246* (2017.01); *H05B 47/125* (2020.01); *G06T 2207/10016* (2013.01); *G06T 2207/30204* (2013.01)

(58) Field of Classification Search
CPC .......... G06T 7/246; G06T 2207/10016; G06T 2207/30204; H05B 47/125; Y02B 20/40; G06F 3/011; G06F 2203/012; H04N 23/61
See application file for complete search history.

(56) References Cited

U.S. PATENT DOCUMENTS

| | | | |
|---|---|---|---|
| 2013/0089334 A1* | 4/2013 | Lin | G08C 23/04 398/106 |
| 2014/0071103 A1* | 3/2014 | Yang | G06V 10/141 345/207 |

(Continued)

FOREIGN PATENT DOCUMENTS

| | | |
|---|---|---|
| CN | 1794010 | 6/2006 |
| CN | 106599929 | 4/2017 |

(Continued)

OTHER PUBLICATIONS

"Office Action of Taiwan Counterpart Application", issued on Apr. 27, 2022, p. 1-p. 6.

(Continued)

*Primary Examiner* — Ping Y Hsieh
*Assistant Examiner* — Vaisali Rao Koppolu
(74) *Attorney, Agent, or Firm* — JCIPRNET

(57) ABSTRACT

The embodiments of the disclosure provide an object tracking method and an object tracking device. The method includes: in a tracking state, controlling an image-capturing device to capture a first image of a specific object, wherein a plurality of light emitting elements are disposed on the specific object, and at least one first light emitting element of the light emitting elements is on and captured in the first image; determining a first object pose of the specific object based on the at least one first light emitting element of the light emitting elements in the first image; obtaining at least one second light emitting element of the light emitting elements based on the first object pose, wherein the at least one second light emitting element is estimated to be uncapturable by the image-capturing device; and turning off the at least one second light emitting element.

16 Claims, 5 Drawing Sheets

(56) References Cited

U.S. PATENT DOCUMENTS

2014/0125813 A1* 5/2014 Holz .................. G06F 3/017
                                                            348/169
2016/0307332 A1* 10/2016 Ranjan ............... A63F 13/213
2016/0364910 A1* 12/2016 Higgins .............. A63F 13/213
2018/0329517 A1* 11/2018 Steedly ................ G01D 5/26
2018/0330521 A1* 11/2018 Samples ............... G06T 7/80
2019/0026904 A1* 1/2019 Chen ................... G06T 7/238
2020/0201045 A1* 6/2020 Liu ..................... H04N 23/56

FOREIGN PATENT DOCUMENTS

| CN | 107206529 | 9/2017 |
| CN | 110612506 | 12/2019 |
| TW | 201909030 | 3/2019 |

OTHER PUBLICATIONS

"Office Action of China Counterpart Application", issued on Jul. 7, 2023, p. 1-p. 8.

* cited by examiner

OBJECT TRACKING METHOD AND OBJECT TRACKING DEVICE

CROSS-REFERENCE TO RELATED APPLICATION

This application claims the priority benefit of U.S. provisional application Ser. No. 63/069,728, filed on Aug. 25, 2020. The entirety of the above-mentioned patent application is hereby incorporated by reference herein and made a part of this specification.

BACKGROUND OF THE INVENTION

1. Field of the Invention

The disclosure generally relates to an object tracking technique, in particular, to an object tracking method performed based on light emitting elements disposed on the to-be-tracked object and an object tracking device using the same.

2. Description of Related Art

See FIG. 1, which shows a conventional object tracking mechanism. In FIG. 1, a specific object 199 to be tracked may be disposed with multiple light emitting elements 104 (e.g., light emitting diodes) on different surfaces of the specific object. In this case, the image-capturing device 102 may be used capture images of the specific object 199, and these images may be used to determine the object pose (e.g., location/orientation/rotation/translation) of the specific object 199. Specifically, an object tracking device may obtain the images captured by the image-capturing device 102 and analyze the light distribution of the light emitting elements 104 captured in the images to obtain the object pose of the specific object 199.

However, due to the limitation of the image-capturing range of the image-capturing device 102, some of the light emitting elements 104 may not be captured by the image-capturing device 102. That is, only a part of the light emitting elements 104 is visible to the image-capturing device 102, yet some of the light emitting elements 104 may be invisible to the image-capturing device 102.

In this case, if those invisible light emitting elements 104 are constantly on (i.e., emitting lights), extra power consumption may be generated.

SUMMARY OF THE INVENTION

Accordingly, the disclosure is directed to an object tracking method and an object tracking device, which may be used to solve the above problem.

The embodiments of the disclosure provide an object tracking method, adapted to an object tracking device. The method includes: in a tracking state, controlling an image-capturing device to capture a first image of a specific object, wherein a plurality of light emitting elements are disposed on the specific object, and at least one first light emitting element of the light emitting elements is on and captured in the first image; determining a first object pose of the specific object based on the at least one first light emitting element of the light emitting elements in the first image; obtaining at least one second light emitting element of the light emitting elements based on the first object pose, wherein the at least one second light emitting element is estimated to be uncap- turable by the image-capturing device; and turning off the at least one second light emitting element.

The embodiments of the disclosure provide an object tracking device including a storage circuit and a processor. The storage circuit stores a program code. The processor is coupled to the non-transitory storage circuit and accesses the program code to perform: in a tracking state, controlling an image-capturing device to capture a first image of a specific object, wherein a plurality of light emitting elements are disposed on the specific object, and at least one first light emitting element of the light emitting elements is on and captured in the first image; determining a first object pose of the specific object based on the at least one first light emitting element of the light emitting elements in the first image; obtaining at least one second light emitting element of the light emitting elements based on the first object pose, wherein the at least one second light emitting element is estimated to be uncapturable by the image-capturing device; and turning off the at least one second light emitting element.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
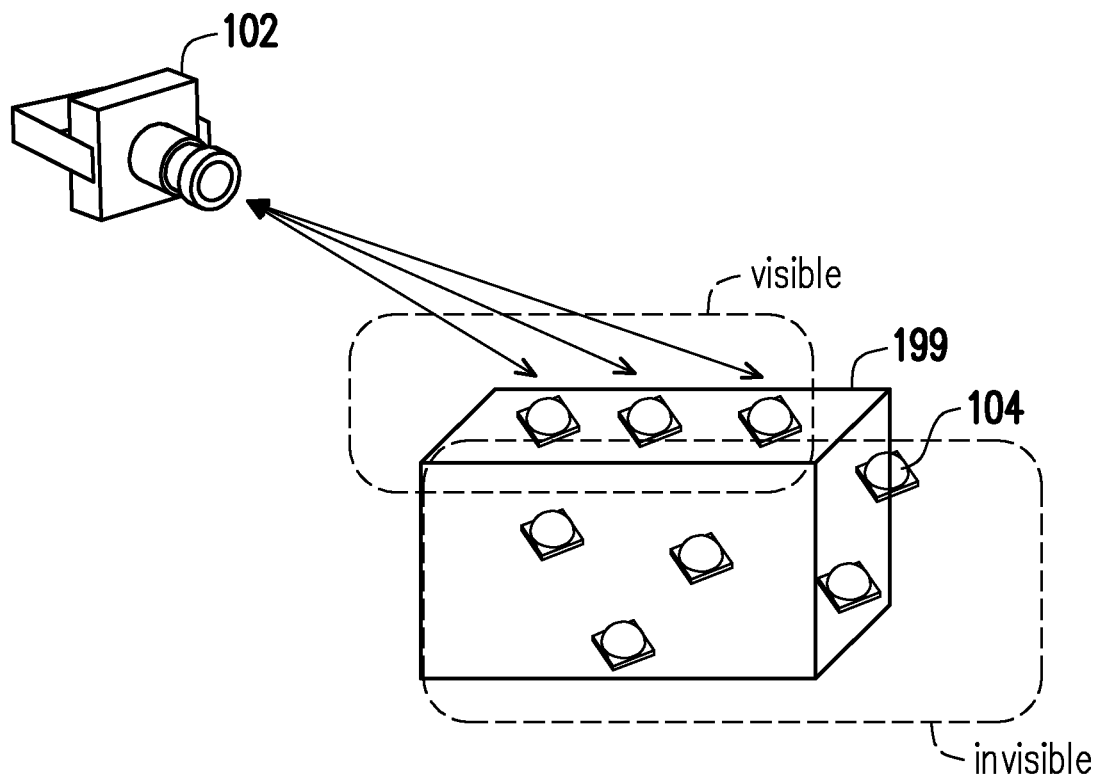
FIG. 1 shows a conventional object tracking mechanism.

Reference will now be made in detail to the present preferred embodiments of the invention, examples of which are illustrated in the accompanying drawings. Wherever possible, the same reference numbers are used in the drawings and the description to refer to the same or like parts.

Figure 2:
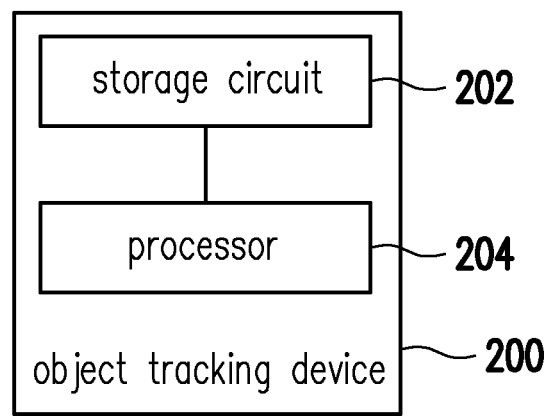
FIG. 2 shows a schematic diagram of an object tracking device according to an embodiment of the disclosure.

See FIG. 2, which shows a schematic diagram of an object tracking device according to an embodiment of the disclosure. In some embodiments, the object tracking device 200 may be any computer device and/or a smart device, and the object tracking device 200 may be used to track a specific object disposed with a plurality of light emitting elements (e.g., LEDs). In some embodiments, after obtaining an image of the specific object, the object tracking device 200 may obtain an object pose (e.g., location/orientation/translation/rotation) of the specific object based on the distribution of the lights of the light emitting elements captured in the image.

In various embodiments, the specific object may be any to-be-tracked object. For example, the object tracking device 200 may belong to a virtual reality (VR) system, wherein the VR system may include some interactive devices for the user to interact with the VR content provided by the VR system, such as VR gloves and/or VR handheld controller. In this case, the external surfaces of these interactive devices may be distributed/mounted with the light emitting elements, and the object tracking device 200 may control an image-capturing device (e.g., a camera) to capture images of these interactive devices and obtain the poses of these interactive devices based on the distribution of the lights captured in each image. Accordingly, the gesture of the user holding/using the interactive devices may be obtained for further adjusting the VR contents, but the disclosure is not limited thereto.

In FIG. 2, the object tracking device 200 includes a storage circuit 202 and a processor 204. The storage circuit 202 is one or a combination of a stationary or mobile random access memory (RAM), read-only memory (ROM), flash memory, hard disk, or any other similar device, and which records a program code and/or a plurality of modules that can be executed by the processor 204.

The processor 204 may be coupled with the storage circuit 202, and the processor 204 may be, for example, a graphic processing unit (GPU), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program codes stored in the storage circuit 202 to implement the object tracking method provided in the disclosure, which would be further discussed in the following.

In the embodiments of the disclosure, the object tracking device 200 may operate in a search state or a tracking state. In the cases where the object tracking device 200 is not able to track the specific object (e.g., the specific object has been lost tracked by the object tracking device 200 or the object tracking device 200 just started to track the specific object), the object tracking device 200 may operate in the search state to try to find the specific object.

Once the specific object has been found and is trackable in an image-capturing range of the image-capturing device 102, the object tracking device 200 may switch to operate in the tracking state to keep tracking the specific object. However, if all the light emitting elements on the specific object are always on, extra power consumption may be generated. Accordingly, the embodiments of the disclosure may be used to adaptively turn off some of the light emitting elements on the specific object, such that the power consumption may be reduced.

Figure 3:
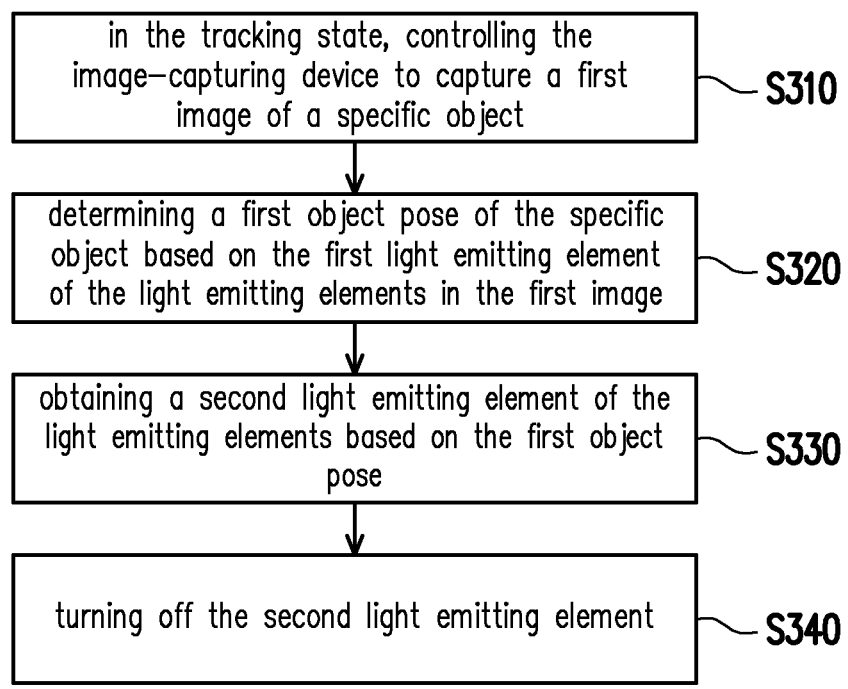
FIG. 3 shows a flow chart of the object tracking method according to an embodiment of the disclosure.

See FIG. 3, which shows a flow chart of the object tracking method according to an embodiment of the disclosure. The method of this embodiment may be executed by the object tracking device 200 in FIG. 2, and the details of each step in FIG. 3 will be described below with the components shown in FIG. 2. In addition, for better understanding the concept of the disclosure, FIG. 4 would be used as an example, wherein FIG. 4 shows an application scenario illustrated according to a first embodiment of the disclosure.

Firstly, in step S310, in the tracking state, the processor 204 controls the image-capturing circuit 102 to capture a first image IM1 of a specific object 400, wherein a plurality of light emitting elements are disposed on the specific object 400, and at least one first light emitting element of the light emitting elements is on and captured in the first image IM1. In FIG. 4, the to-be-tracked specific object 400 may be assumed to be a cuboid having a plurality of surfaces, and each surface may be disposed/mounted with corresponding light emitting elements.

For example, light emitting elements 411-416 may be disposed on a surface 41 of the specific object 400. Light emitting elements 421-425 may be disposed on a surface 42 of the specific object 400. Similarly, other surfaces of the specific object 400 may be disposed with corresponding light emitting elements, but these light emitting elements on the other surfaces may not be observed due to the limitation of the viewing angle of FIG. 4.

Figure 4:
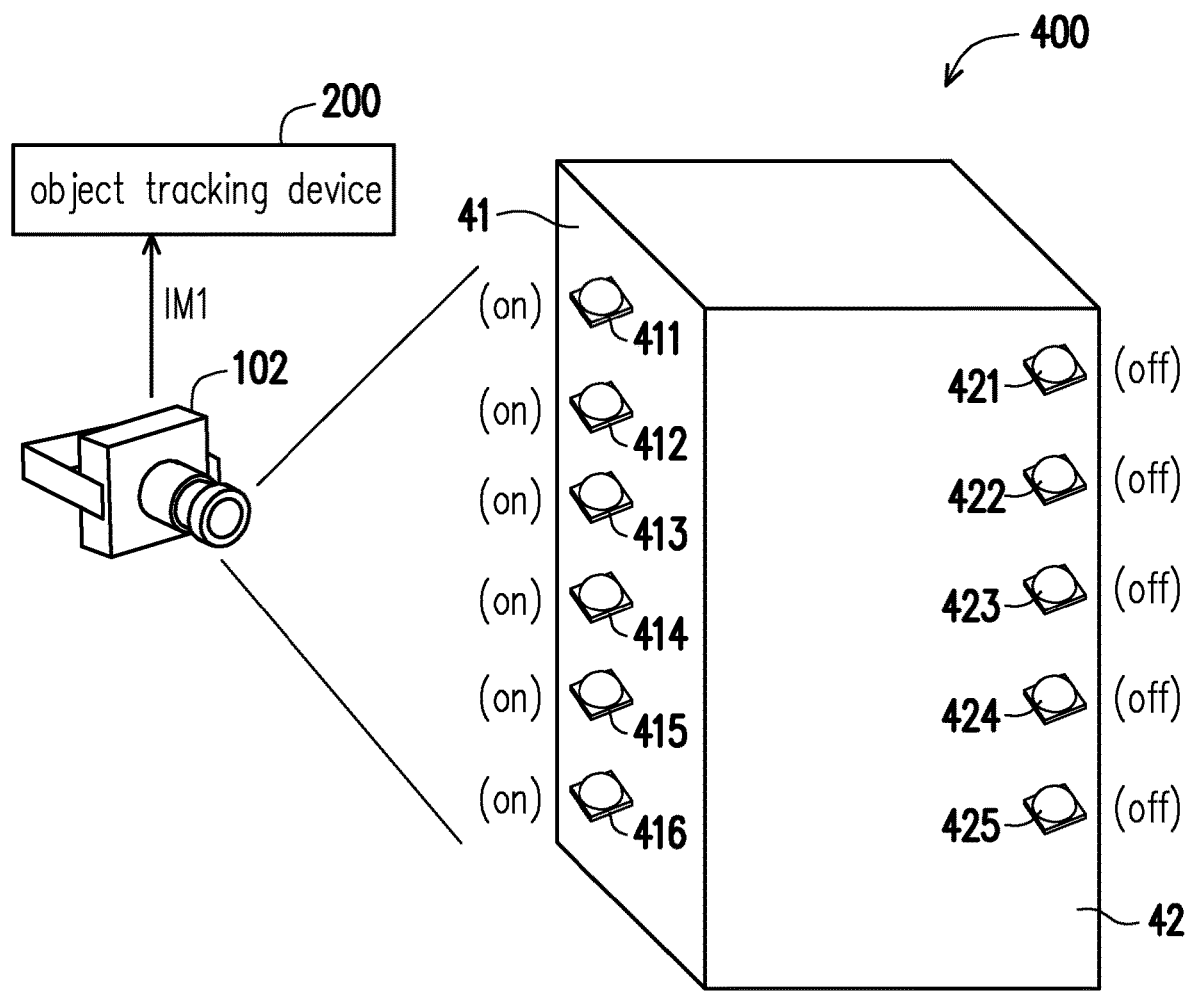
FIG. 4 shows an application scenario illustrated according to a first embodiment of the disclosure.

In FIG. 4, it is assumed that only the surface 41 is visible to the image-capturing device 102, such that only the light emitting elements 411-416 on the surface 41 are capturable to the image-capturing device 102. That is, the light emitting elements 421-425 on the surface 42 are invisible to the image-capturing device 102, but the disclosure is not limited thereto. In this case, only the light emitting elements 411-416 may be captured in the first image IM1, and hence the light emitting elements 411-416 may be understood as the first light emitting element of the light emitting elements, but the disclosure is not limited thereto.

Next, in step S320, the processor 204 determines a first object pose of the specific object 400 based on the first light emitting element of the light emitting elements in the first image IM1. That is, the processor 204 may determine the first object pose of the specific object 400 based on the light emitting elements 411-416 that are on and captured in the first image IM1.

In some embodiments, the position of each light emitting elements on the specific object 400 is known to the processor 204. In this case, the processor 204 may determine the first object pose by performing any known pose detection algorithms (e.g., inside-out tracking and/or outside-in tracking) based on the light distribution of the lights emitting by the light emitting elements 411-416 in the first image IM1, but the disclosure is not limited thereto.

In step S330, the processor 204 obtains a second light emitting element of the light emitting elements based on the first object pose, wherein the at least one second light emitting element is estimated to be uncapturable by the image-capturing device 102.

In detail, since the first object pose is known to the processor 204, the processor 204 may accordingly estimate which of the light emitting elements is uncapturable to the image-capturing device 102 and regard these uncapturable light emitting elements as the second light emitting element. For example, based on the first object pose in FIG. 4, the processor 204 would know that only the light emitting elements 411-416 on the surface 41 are capturable (i.e., visible) to the image-capturing device 102, and the light emitting elements on other surfaces (e.g., the surface 42) are uncapturable (i.e., invisible) to the image-capturing device 102. In other words, the light emitting elements on the surfaces other than the surface 41 are not in the line of sight of the image-capturing device 102.

Therefore, the processor 204 may regard the light emitting elements on the surfaces other than the surface 41 as the second light emitting elements, but the disclosure is not limited thereto.

Next, in step S340, the processor 204 turns off the second light emitting element. In FIG. 4, the processor 204 may turn off the light emitting elements on the surfaces other than the surface 41, e.g., the light emitting elements 421-425, such that each second light emitting element stops to emit lights. In various embodiments, the object tracking device 200 may further include a wireless communication circuit coupled to the processor 204, and the processor 204 may control the wireless communication circuit to send a first control signal to each second light emitting element to turn off each second light emitting element. In other embodiments, assuming that all the light emitting elements are controlled by a control logic, the processor 204 may send a first demand signal to the control logic to demand the control logic to turn off each second light emitting element, but the disclosure is not limited thereto.

In some embodiments, some of the second light emitting elements may be already off, and the processor 204 may use the first control signal to keep them off, or ask the control logic to keep them off, but the disclosure is not limited thereto.

Accordingly, the power consumption may be reduced after turning off the second light emitting element. Besides, since each second light emitting element is invisible to the image-capturing device 102, the performance of tracking the specific object 400 would not be affected.

In some embodiments, if the image-capturing device 102 is far from the specific object 400, the lights of two adjacent light emitting elements may not be distinguished in the images captured by the image-capturing device 102. For example, in FIG. 4, when the image-capturing device 102 is far from the specific object 400, the lights of the adjacent light emitting elements 411 and 412 may be collectively captured as a large/blur light spot in the first image IM1. Similarly, other adjacent light emitting elements on the surface 41 would be collectively captured as other large light spot in the first image IM1. In this case, the tracking performance may be worse due to the processor 204 may not be able to properly determine the object pose of the specific object 400 based on the large/blur light spots in the first image IM1.

Therefore, the embodiments of the disclosure further provide a mechanism for solving the above problem, and the detailed discussion would be provided in the following.

Figure 5:
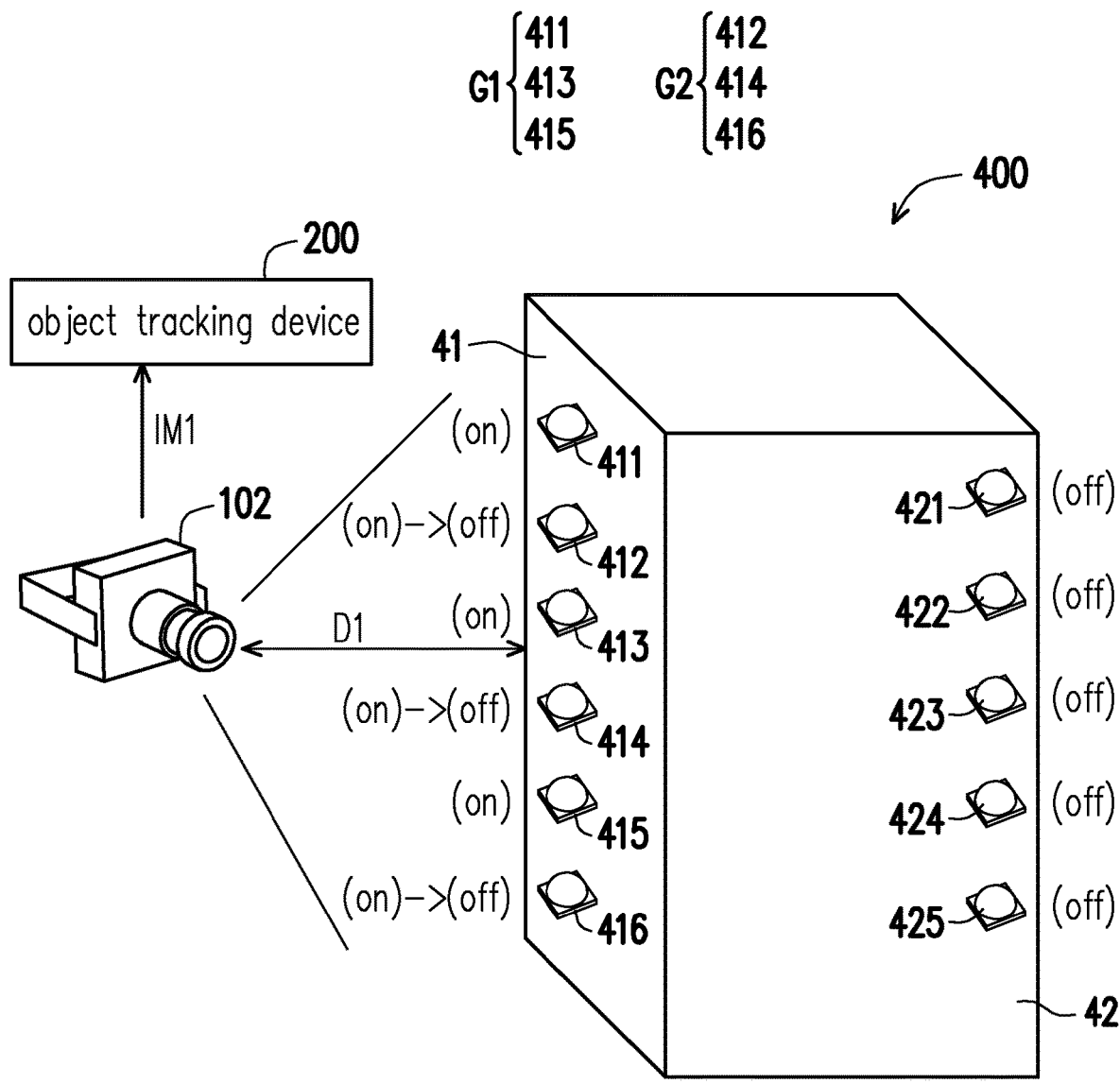
FIG. 5 shows an application scenario illustrated according to a second embodiment of the disclosure.

See FIG. 5, which shows an application scenario illustrated according to a second embodiment of the disclosure. In the embodiments of the disclosure, the first light emitting elements may be divided into a first group and a second group. For example, the light emitting elements 411-416 (i.e., the first light emitting elements) may be divided into a first group G1 and a second group G2, wherein the first group G1 may include the light emitting elements 411, 413, and 415, and the second group G2 may include the light emitting elements 412, 414, and 416, but the disclosure is not limited thereto.

In some embodiments, all the light emitting elements may be divided into a first group and a second group in advance. In this case, the first group may exemplarily include the light emitting elements 411, 413, 415, 421, 423, 425 (and some of the light emitting elements on other surfaces). The second group may exemplarily include the light emitting elements 412, 414, 416, 422, 422 (and some of the light emitting elements on other surfaces). In other embodiments, the processor 204 may firstly obtain the light emitting elements captured in the first image IM1 (i.e., the first light emitting elements) and then divide theses light emitting elements into the first group G1 and the second group G2, but the disclosure is not limited thereto In one embodiment, the processor 204 may obtain an object distance D1 between the image-capturing device 102 and the specific object 400. In some embodiments, since the processor 204 can obtain a location of the specific object 400 based on the first object pose of the specific object 400, the processor 204 may accordingly estimate the object distance D1. In some embodiments, the processor 204 may regard the location of the image-capturing device 102 as an origin in a coordinate system. In this case, after obtaining a location of the specific object 400 in the coordinate system, the processor 204 may accordingly obtain the distance between the image-capturing device 102 and the specific object 400 in the coordinate system as the object distance D1, but the disclosure is not limited thereto.

In one embodiment, the processor 204 may determine whether the object distance D1 is larger than a first distance threshold. In various embodiments, the value of the first distance threshold may be determined based on the requirements of the designer. In one embodiment, the value of the first distance threshold may be determined to be a minimum distance where the processor 204 cannot distinguish the lights from adjacent light emitting elements in the images captured by the image-capturing device 102. For example, if the processor 204 cannot distinguish the lights from adjacent light emitting elements in the captured images with the object distance D1 larger than 80 cm, the first distance threshold may be determined to be 80 cm, but the disclosure is not limited thereto.

In one embodiment, in response to determining that the object distance D1 between the image-capturing device 102 and the specific object 400 is larger than the first distance threshold, the processor 204 may turn off the light emitting elements in the second group G2 (e.g., the light emitting elements 412, 414, 416). On the other hand, in response to determining that the object distance D1 between the image-capturing device 102 and the specific object 400 is not larger than the first distance threshold, the processor 204 may keep the light emitting elements in the second group G2 (e.g., the light emitting elements 412, 414, 416) to be on.

In FIG. 5, assuming that the object distance D1 is larger than the first distance threshold, the processor 204 may turn off the light emitting elements 412, 414, and 416 in the second group G2. Therefore, in the following images captured by the image-capturing device 102, the processor 204 would be able to distinguish the lights of the light emitting elements 411, 413, 415 in the first group G1 and accordingly determine the object pose of the specific object 400.

In some embodiments, if the distance between two of the light emitting elements in the first group is too close, the processor 204 would still be incapable of distinguishing the lights of these adjacent light emitting elements. Therefore, the distance between any two of the light emitting elements in the first group may be designed to be larger than a second distance threshold. In one embodiment, the second distance may be determined to be a minimum distance where the processor 204 can distinguish the lights of any two of the light emitting elements in the first group when the object distance D1 is larger than the first distance threshold, but the disclosure is not limited thereto.

In some embodiments where the specific object 400 is trackable, some of the first light emitting elements may be further turned off to save more power. Specifically, if the object pose of the specific object 400 is unknown, the number of the captured light emitting elements in one image needs to be larger than a minimum amount for the processor 204 to determine the object pose of the specific object 400. However, once the specific object 400 has been tracked (i.e., the object pose of the specific object 400 is known), the processor 204 may still be able to track the specific object 400 even when the number of the captured light emitting elements is fewer than the minimum amount (because the specific object 400 may be unlikely to perform high speed movement). Therefore, when the object distance D1 is too close, such that the image-capturing device 102 can only capture a few number (which may be smaller than the above minimum amount) of the light emitting elements, the processor 204 may turn off other uncaptured light emitting elements to save more power.

In one embodiment, in the tracking state, in response to determining that only at least one reference light emitting element of the light emitting elements is capturable by the image-capturing device 102 and a number of the reference light emitting elements is less than the minimum amount, the processor 204 may turn off other light emitting elements other than the reference light emitting elements, wherein the minimum amount is an amount of the light emitting elements required for determining the object pose of the specific object 400.

Figure 6:
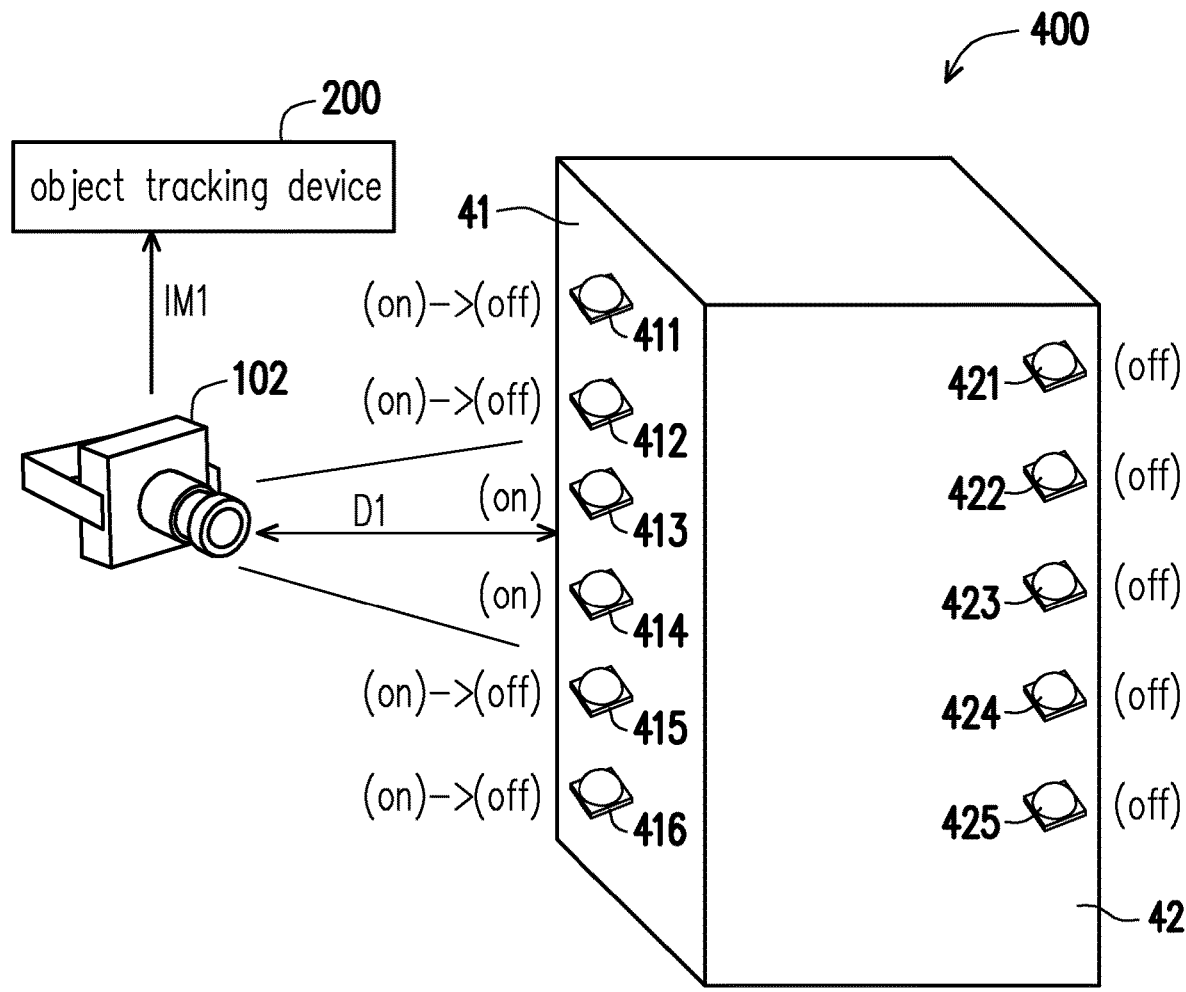
FIG. 6 shows an application scenario illustrated according to FIG. 4 of the disclosure.

See FIG. 6, which shows an application scenario illustrated according to FIG. 4 of the disclosure. In FIG. 6, it is assumed that the object tracking device 200 operates in the tracking state (i.e., the specific object 400 is trackable) and the image-capturing device 102 can only capture the light emitting elements 413 and 414. In this case, the light emitting elements 413 and 414 may be regarded as the reference light emitting elements. Therefore, the processor 204 may further turn off the light emitting elements 411, 412, 415, and 416. Accordingly, more power can be saved without losing tracking of the specific object 400.

In one embodiment, in response to determining that the specific object 400 has been lost tracked, the processor 204 may switch from the tracking state to the search state. In the search state, the processor 204 may obtain at least one specific light emitting element of the light emitting elements on the specific object 400, wherein the at least one specific light emitting element is on right before the specific object 400 is lost tracked. Next, the processor 204 may control the image-capturing device 102 to capture a predetermined number of second images and determine whether the specific object 400 is tracked/found in the second images.

Specifically, once the specific object 400 is lost tracked, the specific object 400 may be easier to be found in the subsequently captured images (i.e., the second images) when the at least one specific light emitting element is on, since there may be no significant change of the object pose of the specific object 400.

In one embodiment, in response to determining that the specific object 400 is tracked/found in the second images, the processor 204 may switch from the search state to the tracking state.

On the other hand, in response to determining that the specific object 400 is not tracked in any of the second images, the processor 204 may turn on all the light emitting elements, such that the chance to track the specific object 400 may be increased. In one embodiment, in response to determining that the specific object 400 has become trackable in the image-capturing range of the image-capturing device 102, the processor 204 may switch from the search state to the tracking state.

In one embodiment, the processor 204 may control the wireless communication circuit to send a second control signal to all light emitting elements to turn on all light emitting elements. In other embodiments, the processor 204 may send a second demand signal to the control logic to demand the control logic to turn on all light emitting elements, but the disclosure is not limited thereto.

In one embodiment, in response to determining that the specific object 400 has changed to be a second object pose, the processor 204 may obtain at least one third light emitting element of the light emitting elements based on the second object pose, wherein the at least one third light emitting element is estimated to be capturable by the image-capturing device 102. Next, the processor 204 may turn on the at least one third light emitting element.

Specifically, when the object pose of the specific object 204 has been changed, some of the off light emitting elements may become visible to the image-capturing device 102. Therefore, when the specific object 400 has changed to be the second object pose, the processor 204 may estimate which of the light emitting elements are currently visible to the image-capturing device 102 and regard these light emitting elements as the third light emitting elements. Accordingly, the processor 204 may turn on the third light emitting elements for achieving better tracking performance, but the disclosure is not limited thereto.

In summary, the embodiments of the disclosure provide a mechanism to adaptively turning off some of the light emitting elements on the to-be-tracked specific object based on the object pose thereof, such that the power consumption may be reduced without degrading the performance of tracking the specific object.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object tracking method, adapted to an object tracking device, comprising:
controlling an image-capturing device to capture a first image of a specific object, wherein a plurality of light emitting elements are disposed on the specific object, and at least one first light emitting element of the light emitting elements is on and captured in the first image, wherein the at least one first light emitting element comprises a first group and a second group;
determining a first object pose of the specific object based on the at least one first light emitting element of the light emitting elements in the first image;
obtaining a location of the specific object based on the first object pose of the specific object;
obtaining an object distance between the image-capturing device and the specific object based on the location of the specific object; and
in response to determining that the object distance between the image-capturing device and the specific object is larger than a first distance threshold, turning off the second group of the at least one first light emitting element.

2. The method according to claim 1, wherein a distance between any two of the light emitting elements in the first group is larger than a second distance threshold.

3. The method according to claim 1, wherein after the step of turning off the second group of the at least one first light emitting element, the method further comprises:
in response to determining that the object distance between the image-capturing device and the specific object is not larger than the first distance threshold, keeping the second group of the at least one first light emitting element to be on.

4. The method according to claim 1, wherein in a tracking state of the object tracking device, the specific object is trackable in an image-capturing range of the image-capturing device.

5. The method according to claim 4, further comprising:
in the tracking state, in response to determining that only at least one reference light emitting element of the light emitting elements is capturable by the image-capturing device and a number of the at least one reference light emitting elements is less than a minimum amount, turning off other light emitting elements other than the at least one reference light emitting element, wherein the minimum amount is an amount of the light emitting elements required for determining an object pose of the specific object.

6. The method according to claim 4, further comprising:
in response to determining that the specific object has been lost tracked, switching from the tracking state to a search state;
in the search state, obtaining at least one specific light emitting element of the light emitting elements, wherein the at least one specific light emitting element is on before the specific object is lost tracked;
controlling the image-capturing device to capture a predetermined number of second images; and
in response to determining that the specific object is tracked in the second images, switching from the search state to the tracking state.

7. The method according to claim 6, further comprising:
in response to determining that the specific object is not tracked in any of the second images, turning on all the light emitting elements.

8. The method according to claim 7, wherein after the step of turning on all the light emitting elements, the method further comprises:
in response to determining that the specific object has become trackable in an image-capturing range of the image-capturing device, switching from the search state to the tracking state.

9. An object tracking device, comprising:
a non-transitory storage circuit, storing a program code; and
a processor, coupled to the non-transitory storage circuit and accessing the program code to perform:
controlling an image-capturing device to capture a first image of a specific object, wherein a plurality of light emitting elements are disposed on the specific object, and at least one first light emitting element of the light emitting elements is on and captured in the first image, wherein the at least one first light emitting element comprises a first group and a second group;
determining a first object pose of the specific object based on the at least one first light emitting element of the light emitting elements in the first image;
obtaining a location of the specific object based on the first object pose of the specific object;
obtaining an object distance between the image-capturing device and the specific object based on the location of the specific object; and
in response to determining that the object distance between the image-capturing device and the specific object is larger than a first distance threshold, turning off the second group of the at least one first light emitting element.

10. The object tracking device according to claim 9, wherein a distance between any two of the light emitting elements in the first group is larger than a second distance threshold.

11. The object tracking device according to claim 9, wherein after turning off the second group of the at least one first light emitting element, the processor further performs:
in response to determining that the object distance between the image-capturing device and the specific object is not larger than the first distance threshold, keeping the second group of the at least one first light emitting element to be on.

12. The object tracking device according to claim 9, wherein in a tracking state of the object tracking device, the specific object is trackable in an image-capturing range of the image-capturing device.

13. The object tracking device according to claim 12, wherein the processor further performs:
in the tracking state, in response to determining that only at least one reference light emitting element of the light emitting element is capturable by the image-capturing device and a number of the at least one reference light emitting elements is less than a minimum amount, turning off other light emitting elements other than the at least one reference light emitting element, wherein the minimum amount is an amount of the light emitting elements required for determining an object pose of the specific object.

14. The object tracking device according to claim 12, wherein the processor further performs:
in response to determining that the specific object has been lost tracked, switching from the tracking state to a search state;
in the search state, obtaining at least one specific light emitting element of the light emitting elements, wherein the at least one specific light emitting element is on before the specific object is lost tracked;
controlling the image-capturing device to capture a predetermined number of second images; and
in response to determining that the specific object is tracked in the second images, switching from the search state to the tracking state.

15. The object tracking device according to claim 14, wherein the processor further performs:
in response to determining that the specific object is not tracked in any of the second images, turning on all the light emitting elements.

16. The object tracking device according to claim 15, wherein after turning on all the light emitting elements, the processor further performs:
in response to determining that the specific object has become trackable in an image-capturing range of the image-capturing device, switching from the search state to the tracking state.

* * * * *